United States Patent [19]

Schoessow

[11] Patent Number: 5,743,211
[45] Date of Patent: Apr. 28, 1998

[54] UNIVERSAL FEED BUNKER FOR LIVESTOCK

[76] Inventor: John R. Schoessow, N5820 Johnson Rd., Portage, Wis. 53901

[21] Appl. No.: 114,391

[22] Filed: Aug. 31, 1993

[51] Int. Cl.$^6$ .................................................. A01K 5/00
[52] U.S. Cl. .................................................. 119/58; 119/60
[58] Field of Search .................................. 119/58, 59, 60; 296/6, 13, 14, 27

[56] References Cited

U.S. PATENT DOCUMENTS

| | | | |
|---|---|---|---|
| 3,834,353 | 9/1974 | Groezinger | 119/60 |
| 3,906,901 | 9/1975 | Cox | 119/58 |
| 4,020,794 | 5/1977 | Nethery | 119/60 |
| 4,258,663 | 3/1981 | Schoessow | 119/60 |
| 4,930,449 | 6/1990 | Harton | 119/60 |
| 5,092,273 | 3/1992 | Meyer | 119/58 |
| 5,205,241 | 4/1993 | Halpin et al. | 119/60 |

FOREIGN PATENT DOCUMENTS 2450556  11/1980  France ............................ 119/58

*Primary Examiner*—Todd E. Manahan
*Attorney, Agent, or Firm*—Keith Schoff

[57] ABSTRACT

Livestock feed bunkers are disclosed which are usable universally with all forms of feed, whether ground, loose or chopped forage, mixed grain and forage, silage, haylage, or hay bales, including large round bales. An open bottom hopper above a floor manger is provided enclosed by a peripheral framework through which heads and necks of livestock can pass, with some framework being gate-mounted to swing about a vertical axis for leaving a side of the feeder unobstructed to facilitate loading of large round bales in side-by-side disposition into the bunker either with axes of the bales transverse and with circumferential faces abutting, or with axes aligned, without the bales being raised above floor level, and also, if desired, with either the unhinged end of the gate-mounted framework being top-hinged to swing inwardly when pushed by the shoulders of livestock toward the center of the manger when animals are reaching for feed in the middle of the bunker.

6 Claims, 4 Drawing Sheets

UNIVERSAL FEED BUNKER FOR LIVESTOCK

FIELD OF ART

Farm or ranch livestock such as cattle, horses, or sheep may be fed from feed bunkers embodying an elevated bin which discharges into underlying feed troughs or mangers.

BACKGROUND OF THE INVENTION

A livestock feed wagon having a hinge mounted endgate is described in U.S. Pat. No. 5,178,096. A livestock feeder wagon embodying an outer framework of angled, parallel bars through which cattle can feed and an inner framework on which removable panels can be secured to provide a feed bunker is described in U.S. Pat. No. 4,258,663. A enclosure for containing livestock feed which has opposite side grates mounted at the top to slide along the top of end grates with the bottoms of the side grates being wheel mounted to roll on the ground under urging by livestock pushing on the grates while feeding is described in U.S. Pat. No. 5,067,422.

SUMMARY OF THE INVENTION

A livestock feeding bunker, which may be footed or wheel mounted, is constructed with permanently mounted panels carried on a peripheral framework grating to form a hopper elevated over a manger configured floor pan. The lesser, width, dimension between the panels is from about three feet to six feet with the latter dimension being sufficient to enable large round hay bales to be placed side-by-side in the bunker between the side panels in either axial alignment or with axes transverse and circumferential faces abutting. The latter configuration is preferred because the axial dimension of large round hay bales is less than the diameter of the bales and accordingly the distance between side panels may be less. The bottom of the hopper is elevated above the outer edge of the manger not more than about twenty inches, and preferably from between six and ten inches. At least one side grate is hinge-mounted to swing as a gate about a vertical axis to render unobstructed one side of the bunker to facilitate loading large round hay bales into the bunker without requiring the bales to be slid into place or to be elevated more than enough to clear the floor of the bunker. Additionally, the same side grate or one or more other grates may be hinge-mounted to swing inward about a top, horizontal axis for enabling livestock to push the grates inward at the bottom with their legs and shoulders while feeding in order to reach feed otherwise inaccessible to them near the center of the bunker.

DESCRIPTION OF THE INVENTION

Figure 1:
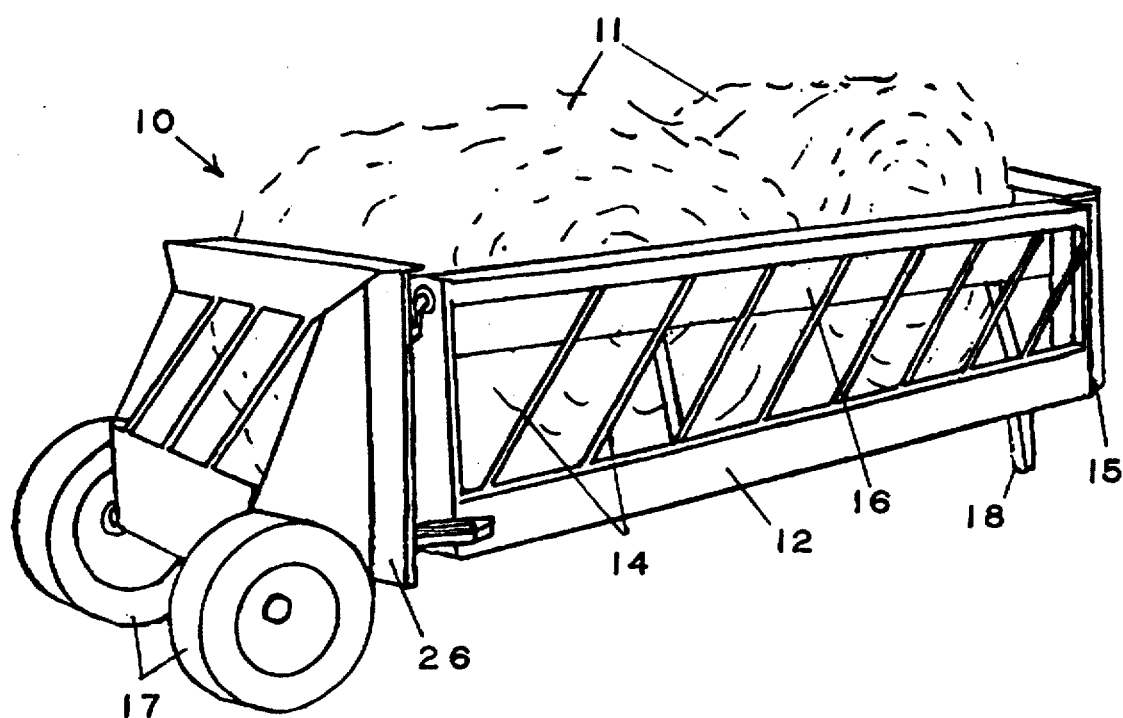
FIG. 1 is a perspective view of a livestock feed bunker wagon of this invention loaded with two large round bales of hay.
Figure 2:
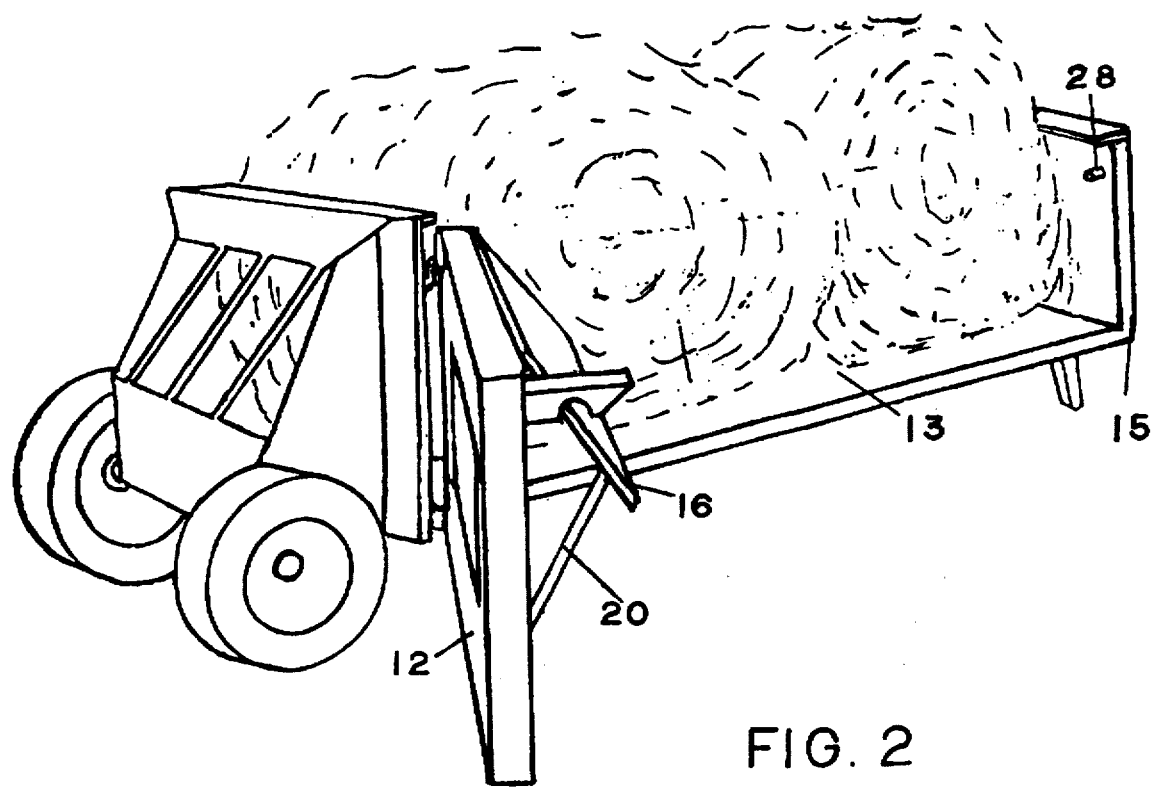
FIG. 2 is a perspective view of the wagon of FIG. 1 with a hinged side grate shown in open position ready for loading large round hay bales.
Figure 3:
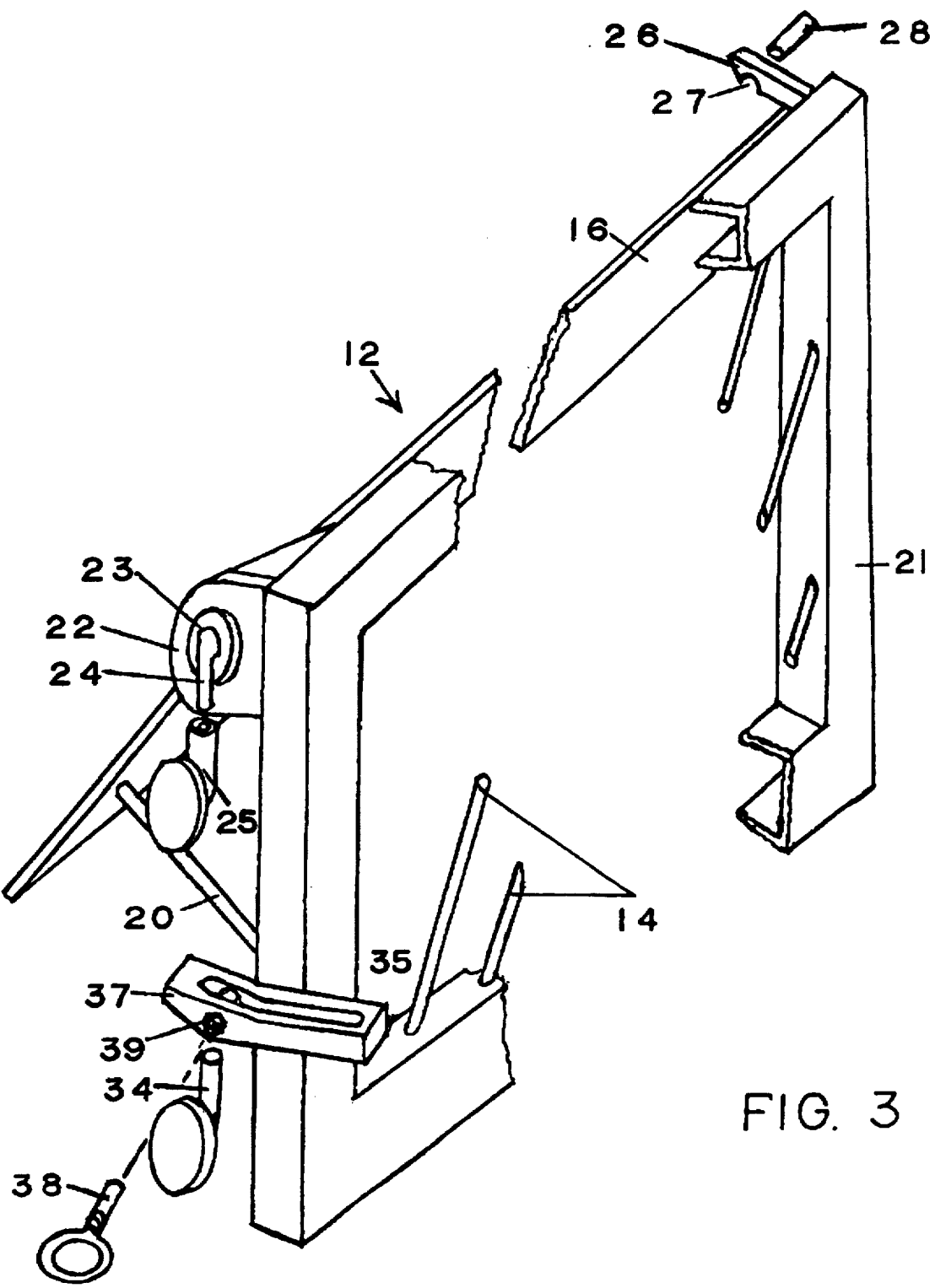
FIG. 3 is an exploded perspective view in partial section of the hinged side grate of FIG. 2.

FIGS. 1, 2, and 3 illustrate livestock feed bunker wagon 10 loaded with two large round hay bales 11. Such bales are typically about five feet in axial length and six feet in diameter. Bales 11 are oriented with the shorter axial length extending perpendicular to the length of wagon 10. The purpose for this is two-fold: one is to provide a permanent, non-removable feed hopper capable of being used universally with livestock feed in all forms without modification and which is of a width which enables livestock to reach feed near the center of the wagon rather than being prevented from doing so by the distance between the side grate and the center of the wagon floor, and secondly, to facilitate loading of large round hay bales in side-by-side position in the wagon with certain conventional handling equipment using a three point hitch attachment for a farm tractor which approaches a bale from the round face side of the bale. As shown in FIG. 2, one or both sides of wagon 10 is provided with gate 12 which is hinge-mounted about a vertical axis at one end for being swung open to leave unobstructed one side of wagon 10 for convenient loading of bales 11 into the wagon from the side. One gate 12 is shown in FIG. 2, however, for wagons capable of holding a greater number of bales, a multiple number of gates may be provided along a side, hinge-mounted either at each end of a wagon or on stationary posts (not shown) placed intermediate the ends of a wagon. Gate 12 may be swung about pivot pin 24 to close into wagon 10 a variable distance beyond the corner of wall 15 and be latched in a selected position to enable livestock to reach farther into wagon 10 toward that end of the gate than elsewhere along the length of the gate.

Wagon 10 may be constructed in the general manner described in my prior U.S. Pat. No. 4,258,663, with a manger configured floor pan 13, optionally with either a stationary or removable, raised, laterally sloped center ridge, not shown, which causes feed to slide laterally toward troughs at the sides of the floor. Similarly, upright angled parallel bars 14 form an outer framework wall of gate 12 with slot-openings through which cattle can place their heads and necks to reach feed within wagon 10. The angular disposition of bars 14 discourages livestock from tossing their heads while feeding and removing forage from wagon 10 where a substantial amount of it drops to the ground and is wasted. Alternatively, a horizontal cable or bar may be provided, preferably adjustable in height, in place of bars 14, but such means is not shown.

Feed retainer plate 16 is affixed to gate 12, together with similar means attached and also on the opposite side of wagon 10, and preferably as well on end walls 15, 26 of wagon 10 although such means are not shown. With gate 12 closed, plates 16 form a feed hopper for retaining loose, granular or chopped feed. The bottom edge of plate 16 is elevated above the outer side of floor 13 a distance of not more than about twenty inches, depending on the angle at which plates 16 are set relative to vertical, and preferably from between six inches and ten inches. On non-openable sides of wagon 10, plates 16 are preferably rigidly welded in place.

Wagon 10 is shown mounted on wheels 17 at the rear and on legs 18 at the front in a manner which is suitable for the front end of the wagon to be lifted and supported while being drawn as an trailer a farm tractor having a three point hitch. However, the feed bunker may be either entirely wheel-mounted or mounted on skids or legs.

Gate 12, as shown in greater detail in FIG. 3, is rigidly secured to plate 16 by welded connection along the top edge and by support struts 20. Gate 12 is configured with channel frame 21 having bars 14 welded or otherwise fastened across the center opening. In one manner of construction, as shown, lug 22 is welded to frame 21 for journaling bearing 23 on the horizontally extending, upper end of right-angularly configured hinge pin 24 to be made in operable manner for enabling rotative movement of the lower portion of hinge pin 24 in a vertical plane. Additionally, the lower portion of hinge pin 24 is also rotatively movable about on its vertical axis when operably received in tubular hinge portion 25, which may be welded to end frame 26 of wagon 10 as shown in FIG. 1.

Lower hinge pin 34 fixed to end frame 26 of wagon 10 is engaged in slot 35 bracket 37, which is welded to gate 12 with the bracket being freely movable over hinge pin 34 along the length of slot 35 except when fixed in position by locking pin 38 being inserted horizontally through bracket 35 and operably secured in threaded engagement in opening 39. In the latter position gate 12 is retained in a vertical upright position and is restricted to movement about a vertical axis.

Latch bar 26 is fixed to the unhinged end of gate 12 with notch 27 therein being aligned with the axis of bearing 23. With gate 12 closed and notch 27 engaged with stud 28 fixed on stationary end frame 15 of wagon 10, gate 12 is pivotally mounted both along its top for swinging movement through a limited distance at the bottom inwardly of wagon 10 when locking pin 38 is removed from bracket 37. When locking pin 38 is inserted in opening 39 with hinge pin 34 being confined to the inboard end of slot 35 in bracket 37, gate 12 is rigged for being swung open about a vertical axis for enabling wagon 10 to be loaded from the side with large round hay bales. If desired, gate 12 can be locked in non-vertical position with the bottom disposed inwardly of the wagon by inserting locking pin 38 in opening 39 when hinge pin 34 is disposed in the outboard end portion of bracket 37. Such positioning may be used when smaller livestock or young animals are feeding.

Figure 4:
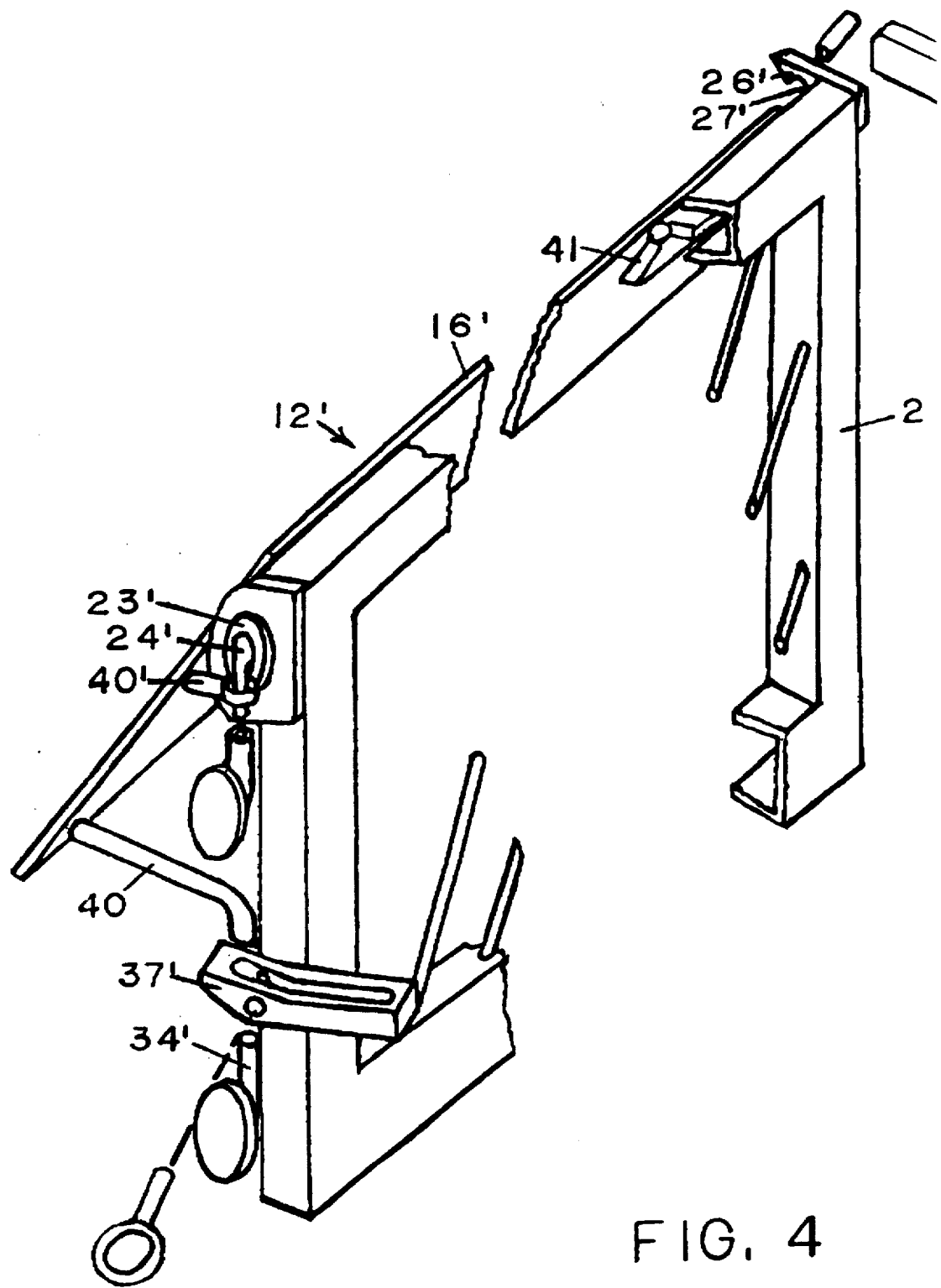
FIG. 4 is an exploded perspective view in partial section of another embodiment of the side grate of a feed bunker wagon.

Gate 12' is shown in FIG. 4 as another embodiment of a side gate for wagon 10. Permanently connected retainer plate 16' is rotatively fastened to the top of gate 12' by hinges 41 with the hinge axis being aligned coincident with the rotational axis of bearing 23' and notch 27' of latch bar 26' so that frame 21' swinggs inwardly at the bottom independently of movement of plate 16'. Latche bar 26' is fixedly attached to plate 16' and is journaled by a bearing, not shown, similar to bearing 23' mounted at the end of gate 12'. Guide bar 42 is welded to end frame 15 of wagon 10 to align and maintain latch bar 26' in horizontal disposition when gate 12' is closed. Struts 40, 40' are provided with the outboard end of tubular strut 40 being bent vertically downward to operably receive the top portion of lower hinge pin 34'. Upper strut 40' is shown similarly engaged with upper hinge pin 24', although operable use of gate 12' can be made without provision of strut 40'.

Preferably, the ends of plate 16' are provided with a pin attachment, not shown, to interlock it to end frames 15, 26 of wagon 10 in order to provide added support and stability to plate 16'.

The operation of gate 12' of FIG. 4 differs from that of gate 12 of FIG. 3 in the matter of plate 16' remaining stationarily in place while gate 12' is swung inwardly at the bottom about a top horizontal axis, whereas gate 12 and plate 16 of FIG. 3 move in unison. Limitation of inward movement of gate 12' by bracket 37' is of added importance compared to the embodiment of FIG. 3 because of the possibility of livestock getting their heads wedged under plate 16 if gate 12' is swung too far inward, whereas in the embodiment of FIG. 3, the same possibility does not exist.

A top-hinged, inward swing framework has been described in relation to a side gate hereinabove, however, it will be apparent that such a framework portion may be provided in a stationary side or end of a livestock feeding structure, regardless of whether or not a feed hopper is provided.

I claim:

1. In a livestock feeding structure embodying a floor and at least one upright framework side provided with opening for livestock to reach with their heads and neck into the structure for the purpose of feeding, an improvement comprising:

a) at least a portion of at least said one upright framework side being hinged to rotate about a substantially vertical axis for providing unobstructed access into said structure through at least a portion of one side of said structure above the level of said floor to facilitate loading large round bales into said structure in side by side disposition, b) a feed hopper having an open bottom elevated above said floor wherein said hopper is permanently affixed in said structure with at least a portion of one side of said hopper being carried by said portion of at least one upright framework side.

2. In a livestock feeding structure embodying a floor and at least one upright framework side provide with opening for livestock to reach with heads and necks into the structure for the purpose of feeding, an improvement comprising:

a) at least a portion of at least one upright framework side being hinged to rotate about a substantially vertical axis for providing unobstructed access into said structure through at least a portion of one side of said structure above the level of said floor to facilitate loading large round bales into said structure in side by side disposition with at least said portion of at least said one upright framework side being provided with openings for livestock to reach with their head and necks into the structure, and being hinged to rotate about a horizontal axis extending adjacent to the top thereof for enabling feeding livestock to reach farther into said structure than would otherwise be possible, by pushing inward the bottom of said portion of at least one upright framework side, b) a feed hopper having an open bottom elevated above said floor wherein said hopper is permanently affixed in said structure with at least a portion of one of said hopper being carried by said portion of at least one upright framework side.

3. The feeding structure of claim 2 comprising in addition:

a) at least said portion of at least said one upright framework side being provided with openings for livestock to reach with their head and necks into the structure, and being hinged to rotate about a horizontal axis extending in substantially parallel adjacency to the top thereof for enabling feeding livestock to reach farther into said structure than would otherwise be possible, by pushing inward the bottom of said portion of at least said one upright framework side, b) a mechanical stop limiting inward movement of said portion into said structure.

4. A livestock feeding structure which is universally applicable for dispersing substantially all forms of solid feed, including large round bales and fine feed, said structure comprising:

a) a manger configured floor, b) a framework rising substantially vertically from the peripheral portion of the floor, wherein at least a portion of said framework is provided with openings for livestock to reach with their heads and necks into the structure for the purpose of feeding, c) a feed hopper carried on said framework above said floor, said feed hopper being configured with side plates with a smaller openings dimension at the bottom of said plates than at the top thereof, a lesser dimension of said opening between said plates at the bottom of said hopper being sufficient to receive therein a hay bale, d) at least one portion of said framework on at least one side of said structure being hinged about a substantially vertical axis at one end to swing open carrying one said side plate of said hopper attached thereto to provide at least a portion of said side of said structure unobstructed above the level of said floor to facilitate loading of bales into said structure from said side, e) latch means for securing said at least one portion of said framework.

5. The feeding structure of claim 4 wherein said at least one portion of said framework is provided with openings for livestock to reach with their head and necks into the structure for purpose of feeding and is hinged about a substantially vertical axis at one end thereof as a means for enabling the unhinged end of said at least one portion of said framework to swing inward of said structure beyond the corner thereof and be secured in such position by stop means for enabling feeding animals to reach farther into said structure than at the hinged end.

6. The feeding structure of claim 4 additionally comprising said at least one portion of said framework being provided with openings for livestock reach with their heads and necks in the structure for the purpose of feeding, and being pivotally mounted to swing about a substantially horizontal axis adjacent to its top said one at least one portion of said framework being elevated to swing inwardly of said structure above said floor, said latch means comprising means fixed to said structure other than said at least one portion of said framework for providing support for said at least one portion of said framework at the unhinged end thereof.

* * * * *